United States Patent
Morita et al.

(10) Patent No.: US 12,202,424 B2
(45) Date of Patent: Jan. 21, 2025

(54) AIRBAG DEVICE

(71) Applicant: Autoliv Development AB, Vargarda (SE)

(72) Inventors: Kazuki Morita, Kanagawa (JP); Kazuhiro Abe, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/254,822

(22) PCT Filed: Oct. 18, 2021

(86) PCT No.: PCT/JP2021/038494
§ 371 (c)(1),
(2) Date: May 26, 2023

(87) PCT Pub. No.: WO2022/118550
PCT Pub. Date: Jun. 9, 2022

(65) Prior Publication Data
US 2023/0415691 A1    Dec. 28, 2023

(30) Foreign Application Priority Data

Dec. 3, 2020  (JP) ................................ 2020-201378

(51) Int. Cl.
*B60R 21/239*  (2006.01)
*B60R 21/203*  (2006.01)
*B60R 21/231*  (2011.01)

(52) U.S. Cl.
CPC .......... *B60R 21/203* (2013.01); *B60R 21/231* (2013.01); *B60R 21/239* (2013.01)

(58) Field of Classification Search
CPC . B60R 21/203; B60R 21/2035; B60R 21/231; B60R 21/239; B60R 2021/2395
See application file for complete search history.

(56) References Cited

U.S. PATENT DOCUMENTS 6,783,151 B2 *  8/2004  Rasch .................. B60R 21/239
                                                        280/739
6,971,670 B1 *  12/2005  Eriksson ............... B60R 21/239
                                                        280/739

(Continued)

FOREIGN PATENT DOCUMENTS

DE    102018006680 B3 *  9/2019
JP    05-082708 U1   11/1993

(Continued)

*Primary Examiner* — Barry Gooden, Jr.
(74) *Attorney, Agent, or Firm* — Foley & Lardner LLP

(57) ABSTRACT

An airbag device mounted on a steering wheel of a vehicle having a rim with a shape in which a distance from the center of rotation to an upper edge part is shorter than a distance to the left and right edge parts, including: a gas generator secured to the steering wheel and for generating expansion gas; and an airbag cushion that expands and deploys toward an occupant side by the expansion gas. The airbag cushion has a vent hole for exhausting the expansion gas. Furthermore, when an occupant comes into contact with the expanded and deployed airbag cushion, the airbag cushion deforms toward the front of the vehicle, and when a portion of an upper region of the airbag cushion advances more forward than the rim of the steering wheel, the vent hole is provided at a position that is blocked by contacting an automobile interior component.

10 Claims, 14 Drawing Sheets

(56) References Cited

U.S. PATENT DOCUMENTS

| | | | | |
|---|---|---|---|---|
| 7,168,736 B2* | 1/2007 | Tanase | ................ | B60R 21/2338 |
| | | | | 280/730.2 |
| 7,441,799 B2* | 10/2008 | Enders | .................... | B62D 1/06 |
| | | | | 280/731 |
| 8,123,248 B2* | 2/2012 | Yamane | ............ | B60R 21/23138 |
| | | | | 280/739 |
| 8,308,191 B2* | 11/2012 | Hiruta | .................. | B60R 21/239 |
| | | | | 280/736 |
| 8,469,394 B2* | 6/2013 | Schuller | .................. | B60N 2/16 |
| | | | | 280/739 |
| 9,283,921 B2* | 3/2016 | Vinton | ................ | B60R 21/2346 |
| 9,428,141 B2* | 8/2016 | Kwon | .................. | B60R 21/239 |
| 9,643,562 B1* | 5/2017 | Choi | .................... | B60R 21/239 |
| 10,507,784 B2* | 12/2019 | Nakanishi | ................ | B62D 1/04 |
| 10,836,339 B2* | 11/2020 | Kadam | .................. | B60R 21/203 |
| 11,260,817 B2* | 3/2022 | Takahashi | ............. | B60R 21/235 |
| 11,780,395 B2* | 10/2023 | Morita | .................. | B60R 21/215 |
| | | | | 280/731 |
| 11,794,681 B2* | 10/2023 | Abe | .................... | B60R 21/2165 |
| 11,865,993 B2* | 1/2024 | Morita | .................. | B60R 21/203 |
| 2002/0047253 A1* | 4/2002 | Rasch | .................. | B60R 21/239 |
| | | | | 280/730.2 |
| 2005/0121889 A1 | 6/2005 | Enders | | |
| 2007/0290488 A1* | 12/2007 | Taguchi | ............ | B60R 21/23138 |
| | | | | 280/730.2 |
| 2008/0106128 A1* | 5/2008 | Kashiwagi | ............ | B60R 21/239 |
| | | | | 297/216.1 |
| 2011/0062692 A1* | 3/2011 | Yamane | ............ | B60R 21/23138 |
| | | | | 280/739 |
| 2011/0115202 A1* | 5/2011 | Hiruta | .................. | B60R 21/239 |
| | | | | 280/741 |
| 2012/0018988 A1* | 1/2012 | Schuller | .................. | B60N 2/16 |
| | | | | 296/65.01 |
| 2013/0234423 A1* | 9/2013 | Higuchi | ................ | B60R 21/239 |
| | | | | 280/742 |
| 2014/0125039 A1* | 5/2014 | Abele | .................. | B60R 21/239 |
| | | | | 280/730.1 |
| 2015/0137489 A1* | 5/2015 | Vinton | ................ | B60R 21/2346 |
| | | | | 280/742 |
| 2016/0046256 A1* | 2/2016 | Kwon | .................. | B60R 21/216 |
| | | | | 280/742 |
| 2018/0215339 A1* | 8/2018 | Nakanishi | ............. | B60R 21/239 |
| 2021/0094498 A1* | 4/2021 | Takahashi | ............. | B60R 21/235 |
| 2021/0146873 A1* | 5/2021 | Ishizuka | ............. | B60R 21/2338 |
| 2022/0089114 A1* | 3/2022 | Morita | .................. | B60R 21/231 |
| 2022/0144201 A1* | 5/2022 | Morita | .................. | B60R 21/203 |
| 2022/0297629 A1* | 9/2022 | Morita | .................. | B60R 21/2165 |
| 2022/0379832 A1* | 12/2022 | Abe | .................... | B60R 21/203 |
| 2023/0001876 A1* | 1/2023 | Abe | .................... | B60R 21/239 |

FOREIGN PATENT DOCUMENTS

| | | |
|---|---|---|
| JP | 2007-062469 A | 3/2007 |
| JP | 2011-051424 A | 3/2011 |
| JP | 2015-160528 A | 9/2015 |
| JP | 2017-094912 A | 6/2017 |
| JP | 2020-026211 A | 2/2020 |
| JP | 2020-026253 A | 2/2020 |
| WO | 2020/170864 A1 | 8/2020 |
| WO | 2020/184167 A1 | 9/2020 |
| WO | 2021/111746 A1 | 6/2021 |

* cited by examiner

[FIG. 1]
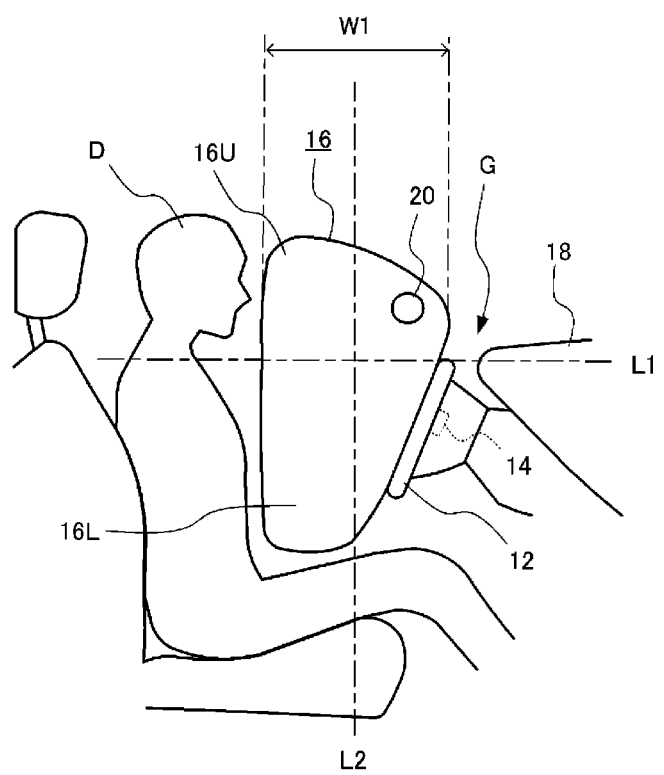
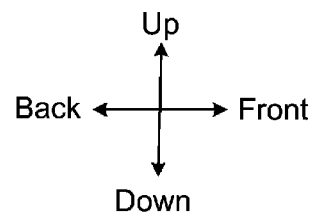

[FIG. 2]
(A)
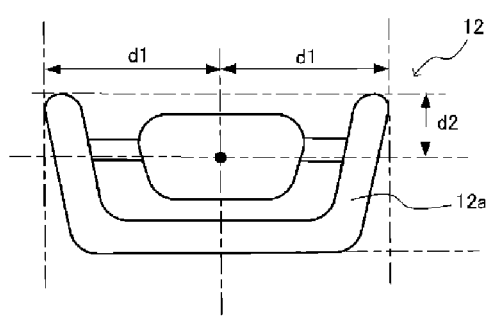
(B)
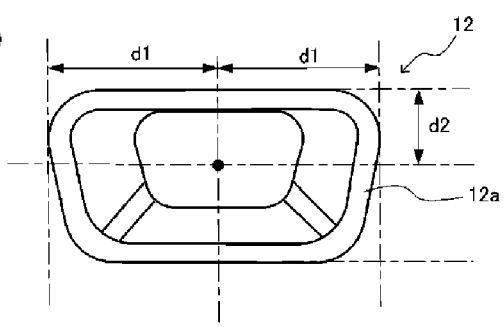
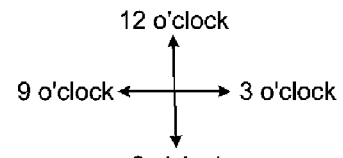
(C)
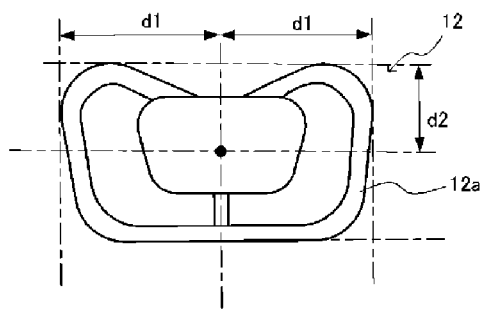

[FIG. 3]
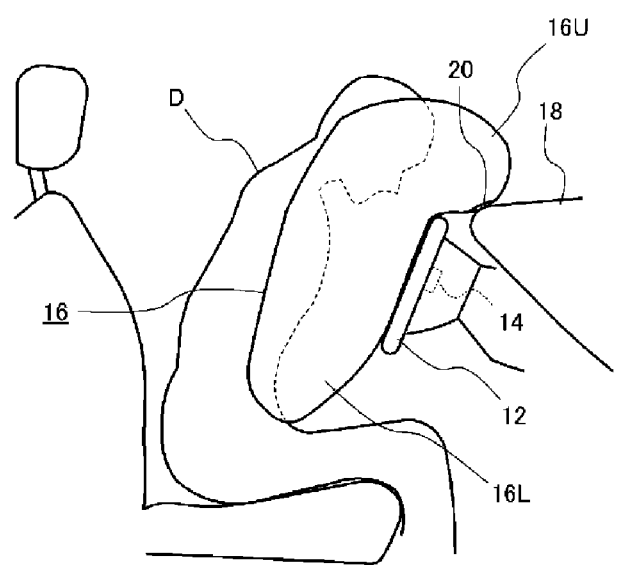
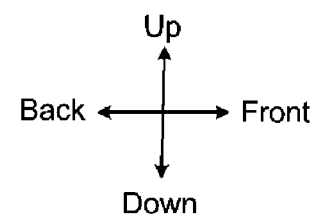

[FIG. 4]
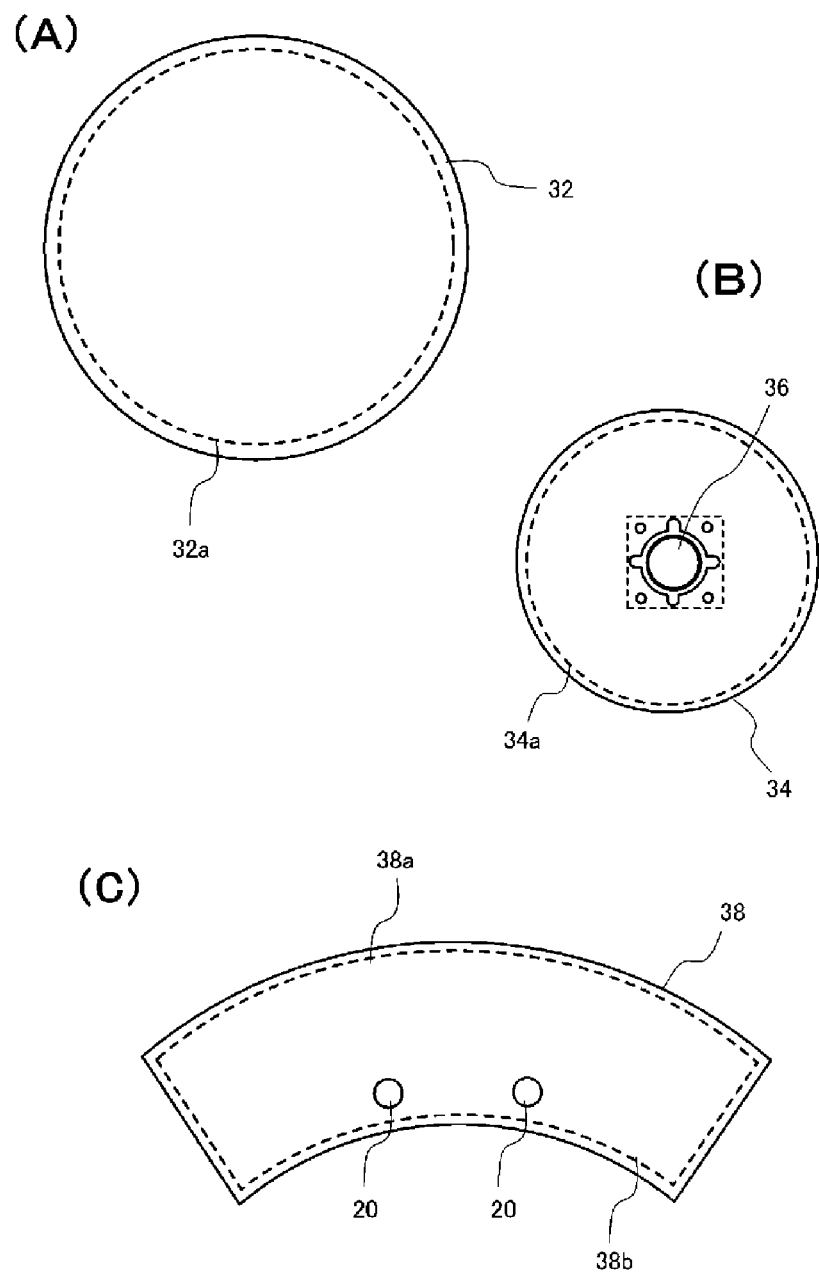

[FIG. 5]
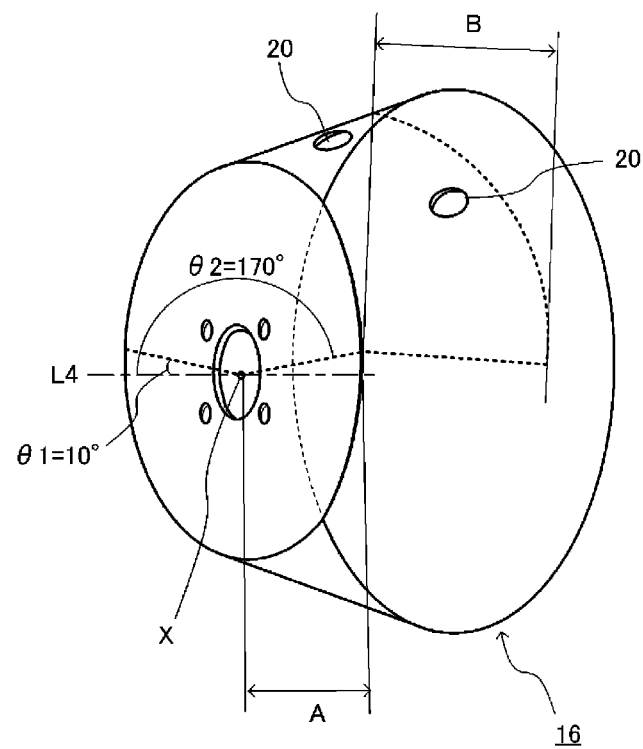

[FIG. 6]
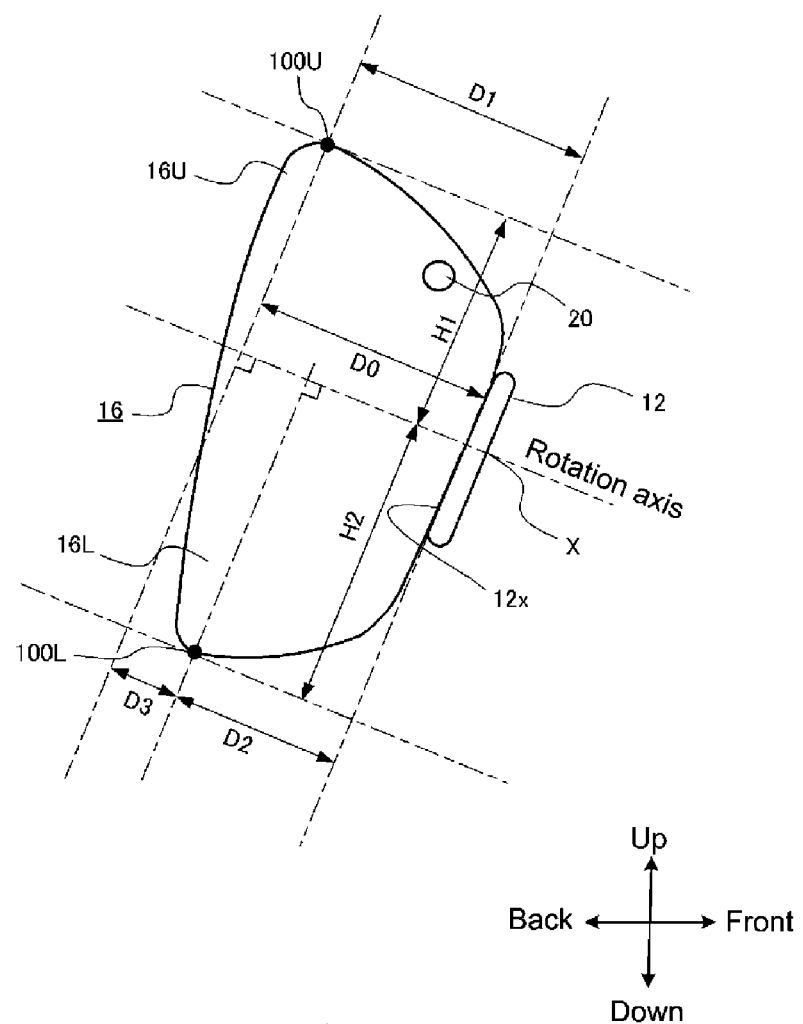
D1 = 350～400mm (355mm)
D2 = 250～320mm (300mm)
D3 = 50mm

[FIG. 7]
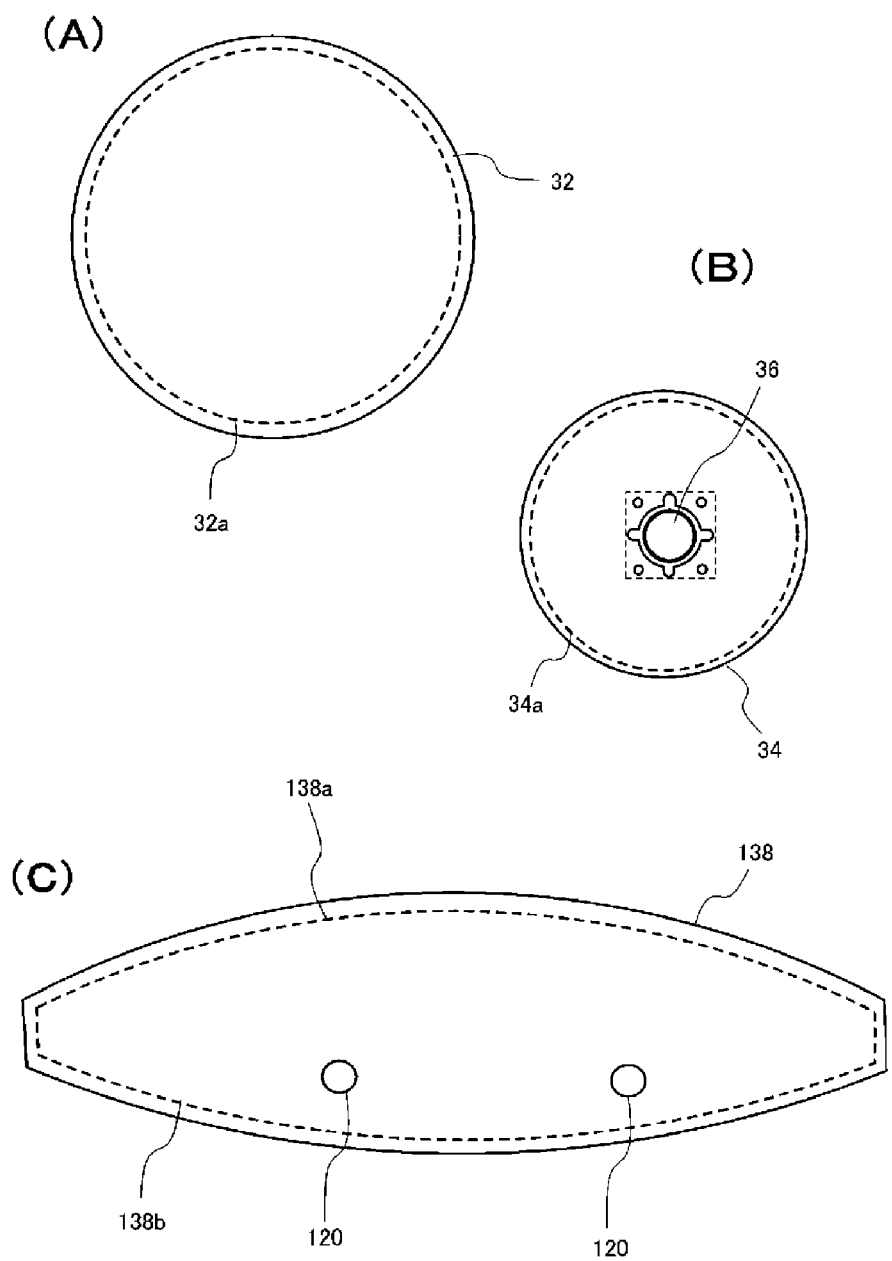

[FIG. 8]
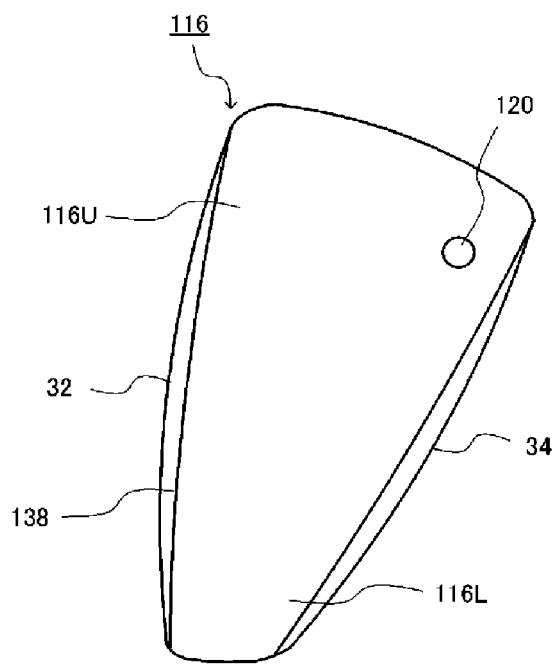
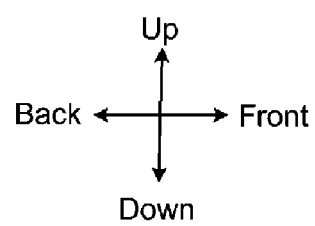

[FIG. 9]
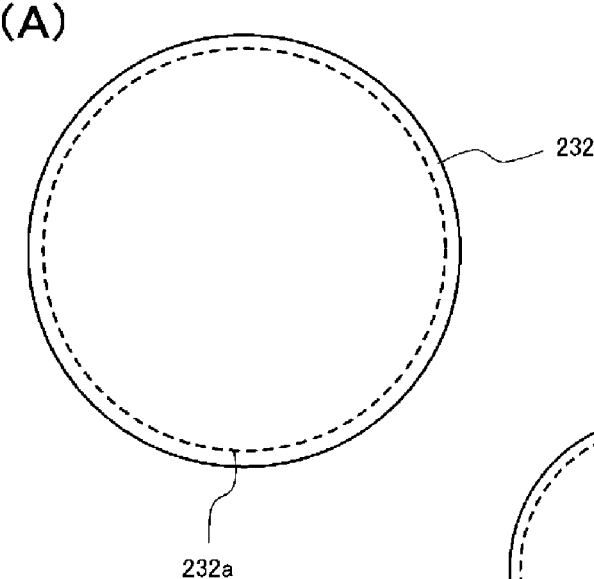
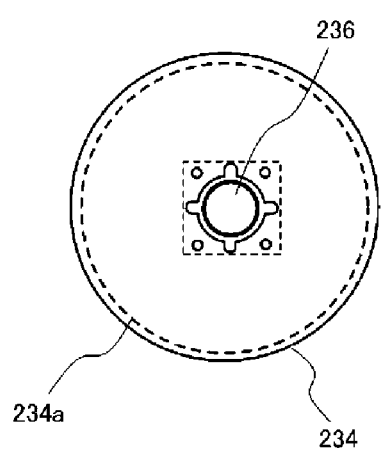
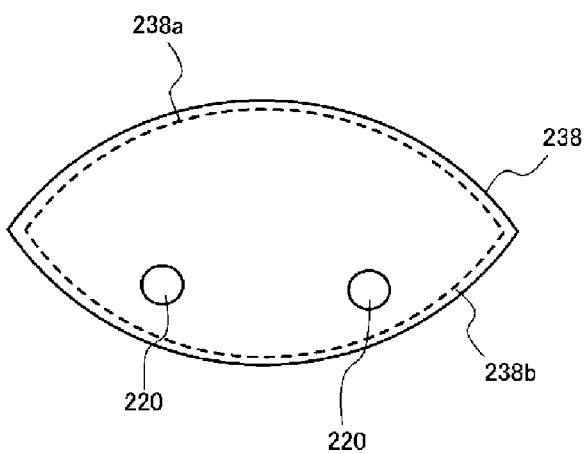

[FIG. 10]
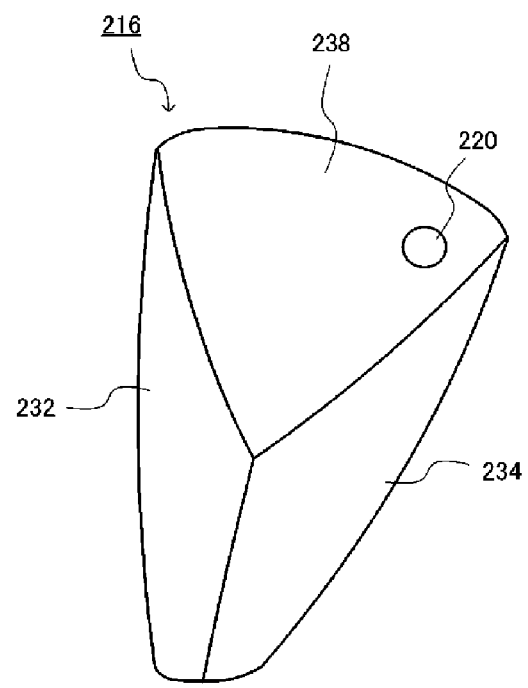
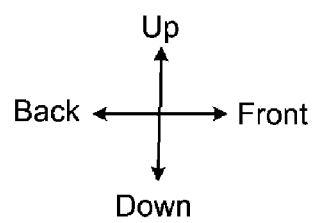

[FIG. 11]
(A)
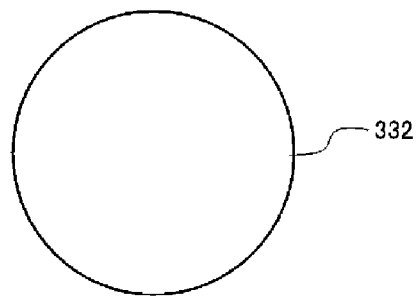
(B)
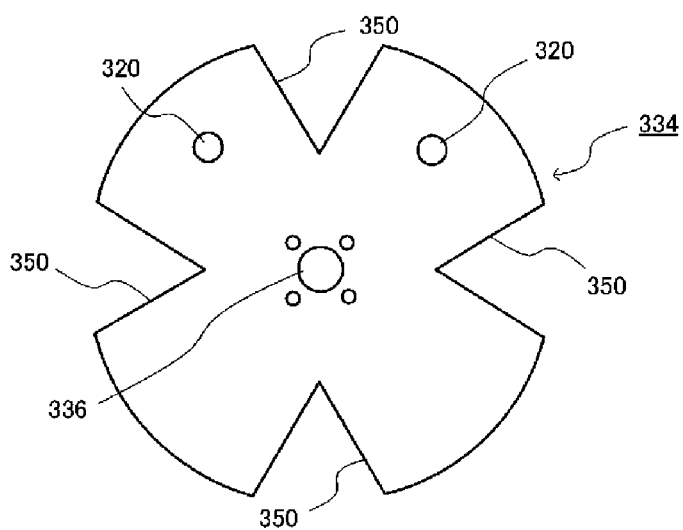
(C)
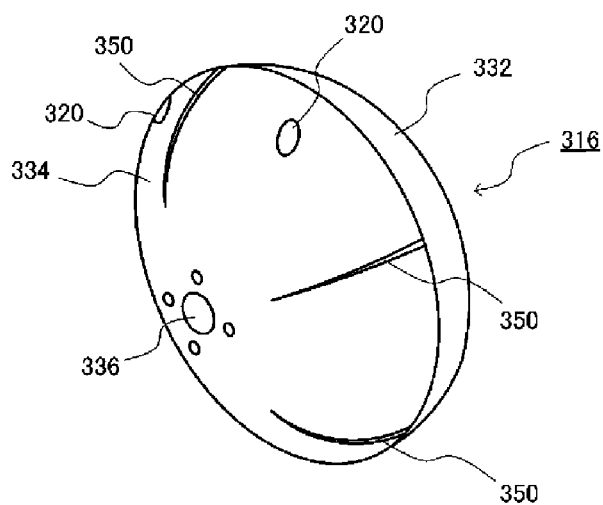

[FIG. 12]
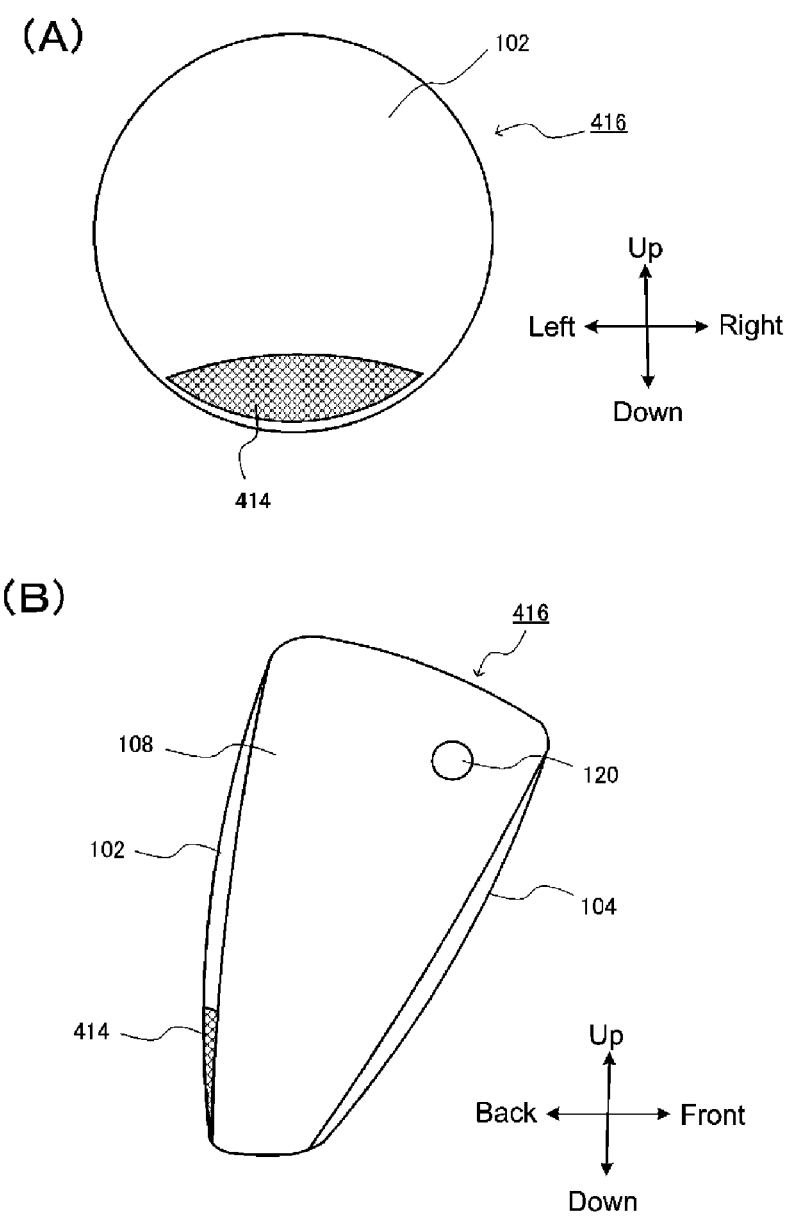

[FIG. 13]
(A)
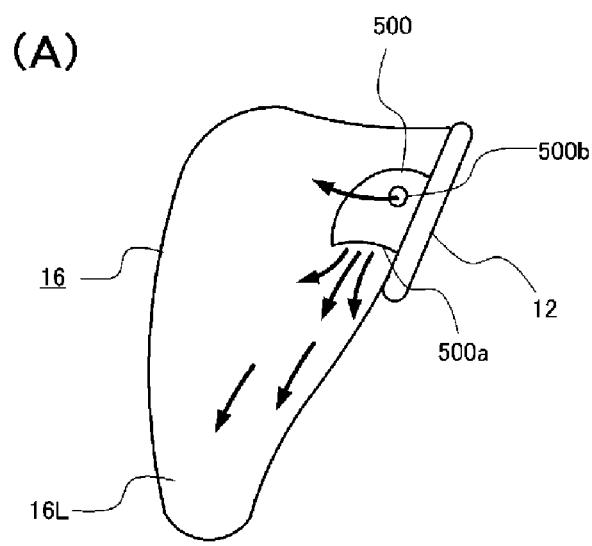
(B)
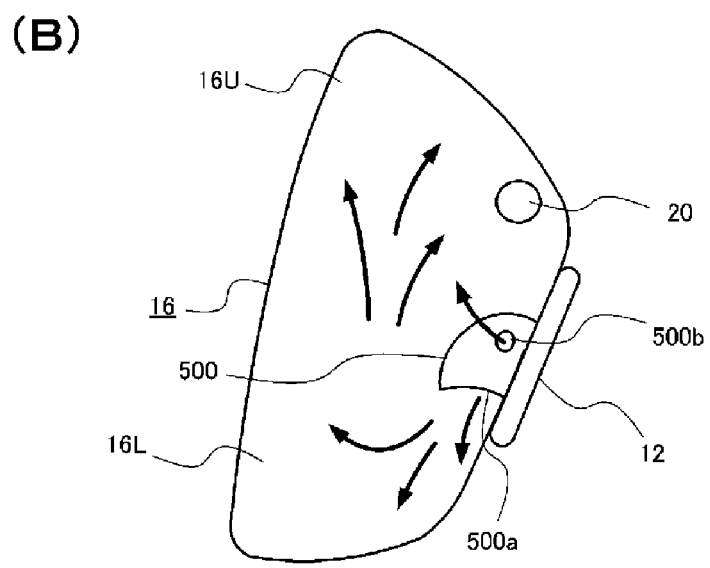

[FIG. 14]
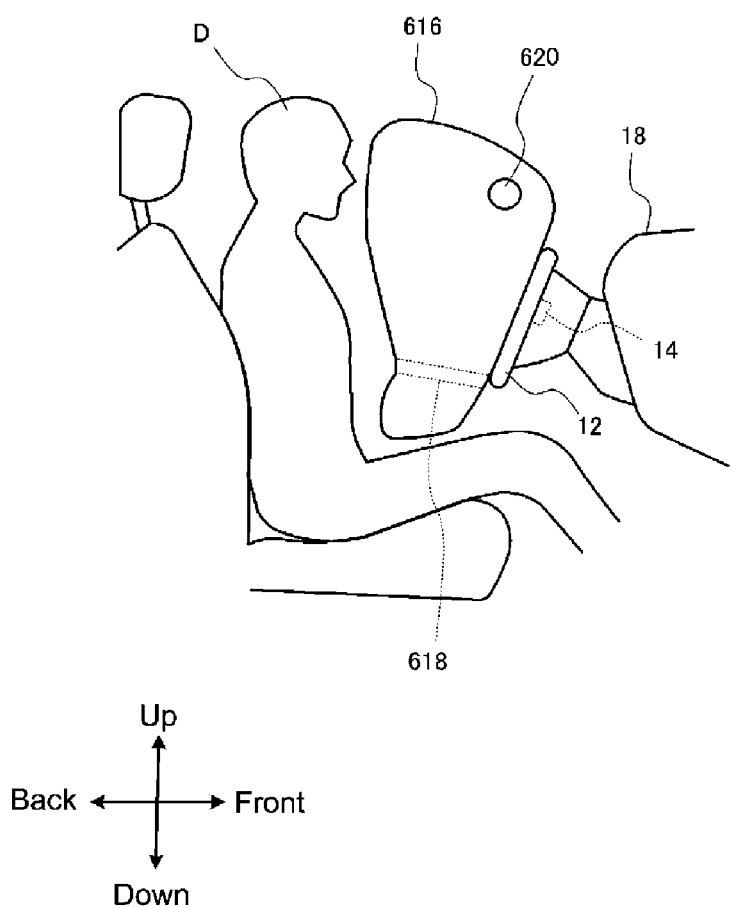

AIRBAG DEVICE

TECHNICAL FIELD

The present invention relates to an airbag device for a vehicle, and particularly relates to a driver airbag device stored in a steering wheel.

BACKGROUND ART

Providing a vehicle with one or a plurality of airbag devices in order to protect an occupant therein in the event of a vehicle accident is well known. There are various forms of airbag devices, such as so-called driver airbag devices that deploy from near the center of a steering wheel to protect a driver, curtain airbags that deploy downward inside a window to protect an occupant in the event of a lateral impact, rollover, or overturning accident, side airbags that are deployed to a side of an occupant (side of a seat) to protect the occupant in the event of a lateral impact of the vehicle, and the like.

A driver airbag device stowed in a steering wheel must securely restrain an occupant by promptly deploying an airbag cushion, and in that respect, it is important that the deployment shape and deployment posture of the airbag cushion are stable. For a driver airbag device, the rim of the steering wheel functions as a reaction force surface when an airbag cushion is deployed, which contributes to the stabilization of the deployment shape and the deployment posture of the airbag cushion.

Incidentally, in addition to the general circular shape, steering wheel shapes such as an irregular shape such as an airplane control stick, in which the upper side (twelve o'clock side) and the lower side (6 o'clock side) of the circular shape are missing, are known. For example, in an irregular-shaped steering wheel in which an upper side (12 o'clock side) is missing when compared to a general steering wheel having a circular rim, there is no reaction force received from the rim on an upper portion of the airbag cushion facing the head of an occupant. Therefore, when the head of the occupant enters into the expanded airbag cushion, the airbag cushion may be pushed forward and down or greatly deformed, and the restraining performance may be impaired.

On the other hand, as disclosed in Patent Document 1, when a vent hole of the airbag cushion is positioned between a rim and spoke of a steering wheel, expansion gas inside the airbag cushion is continuously discharged from the vent hole, and when a large amount of pressure is applied from an occupant, the airbag cushion becomes greatly recessed. Therefore, if the driver has a large physique, the occupant's (driver's) head may crush the airbag cushion and contact (impact) with an instrument panel or the like.

Focusing on the lower side of the steering wheel, a situation must be avoided in which an airbag cushion deployed from near the center of the steering wheel quickly expands toward the vicinity of the driver's abdomen (downward) and the driver impacts the steering wheel. Furthermore, for an irregular-shaped steering wheel in which the lower side (6 o'clock side) of the rim is missing when compared to a general steering wheel having a circular rim, a lower portion region of the airbag cushion must be quickly deployed to restrain the vicinity of the abdomen of an occupant.

RELATED ART DOCUMENTS

Patent Documents

Patent Document 1: Japanese Unexamined Patent Application 2015-160528

SUMMARY OF THE INVENTION

Problem to be Solved by the Invention

In view of the foregoing, an object of the present invention is to provide an airbag device capable of adequately protecting an occupant of a vehicle employing a so-called irregular-shaped steering wheel, even when a large amount of pressure is applied by the occupant to an expanded and deployed airbag cushion.

Another object of the present invention is to provide an airbag device that stabilizes the deployment posture of an airbag cushion and contributes to the improvement of occupant restraining performance in a vehicle employing a so-called irregular-shaped steering wheel.

Means to Solve the Problem

In order to achieve the aforementioned object, the airbag device according to the present invention is an airbag device mounted on a steering wheel of a vehicle having a rim with a shape in which a distance from the center of rotation to an upper edge part is shorter than a distance to left and right edge parts, including: a gas generator secured to the steering wheel and for generating expansion gas; and an airbag cushion that expands and deploys toward an occupant side by the expansion gas. The airbag cushion has a vent hole for exhausting the expansion gas. Furthermore, when an occupant comes into contact with the expanded and deployed airbag cushion, the airbag cushion deforms toward the front of the vehicle, and when a portion of an upper region of the airbag cushion advances more forward than the rim of the steering wheel, the vent hole is provided at a position that is blocked by contacting an automobile interior component.

Herein, "a rim with a shape in which a distance from the center of rotation to an upper edge part is shorter than a distance to the left and right edge parts" means that with respect to a normally used circular (annular) rim, a rim where the vicinity corresponding to 12 o'clock when a surface parallel to the rim is viewed as a clock face is missing, extends horizontally, or is formed in a concave shape. Furthermore, the "lower region" and "upper region" of the airbag cushion can be defined as, for example, below the lower end of the rim of the steering wheel and above the upper end of the steering wheel.

Furthermore, the term "automobile interior component" refers to all interior components below the front windshield and forward of the steering wheel, including the instrument panel and a part of the steering wheel. A state in which an "occupant comes into contact with the expanded and deployed airbag cushion" refers to after a situation such as a frontal collision or the like of the vehicle occurs and the occupant enters into the airbag cushion, in other words, the collision energy of the occupant begins to become absorbed by the airbag cushion. Furthermore, "when at least a portion of an upper region of the airbag cushion advances toward the front of the vehicle from the rim" means that an upper portion of the airbag cushion moves forward over the steering wheel rim and forward (interior component side) due to an impact where the occupant impacts the airbag cushion.

Furthermore, a vent hole being "blocked" is not limited being completely sealed, but also includes situations in which the vent hole is blocked to an extent of being able to effectively inhibit the discharge of expansion gas and maintain the shape of the expanded and deployed airbag cushion.

According to the present invention, when an upper region of the airbag cushion advances more forward than the steering wheel due to the entry of an occupant, the vent hole is blocked by contacting an automobile interior component. Therefore, for example, when an occupant with a large physique enters (contacts) the airbag cushion, gas is not discharged from the vent hole more than necessary, and thus the deployment shape (internal pressure) of the airbag cushion can be maintained. As a result, it is possible to avoid a situation in which an occupant is sandwiched by a collapsed airbag cushion and impacts an instrument panel or other automobile interior component, thereby reliably protecting the occupant. Note that an "occupant with a large physique" can be considered, for example, an AM50 equivalent or larger occupant as defined in the crash safety performance evaluation standards by FMVSS 208 (U.S. crash safety regulations).

On the other hand, if the occupant's physique is relatively small and the forward deformation of the airbag cushion is small, the airbag cushion can maintain a proper deployment posture and shape with only the reaction force from the steering wheel. Therefore, the vent holes are not blocked by the automobile interior component, the airbag cushion expands and deploys normally, and the expansion gas is exhausted through the vent holes. Note that an "occupant with a small physique" can be considered, for example, an AF05 equivalent or smaller occupant as defined in the crash safety performance evaluation standards by FMVSS 208 (U.S. crash safety regulations).

The vent hole is preferably formed higher than an upper end (L1) of the rim and forward of a center line (L2) extending orthogonally when the expanded and deployed airbag cushion is viewed from a side. Herein, the center line (L2) can be defined as a vertical line passing through a center position of a maximum width W1 of the expanded and deployed airbag cushion.

The vent hole can be formed in a range of 150 mm to 400 mm from the center of an attachment position of the gas generator as a distance (A+B) on a front surface of the airbag cushion. Note that the "center of an attachment position of the gas generator" may coincide with a center of rotation of the steering wheel.

The vent hole can be formed within a range of 10° to 170° upward with respect to a line hypothetically drawn in a horizontal direction from the center of the attachment position of the gas generator, when the expanded and deployed airbag cushion is viewed from the steering wheel side or occupant side.

By arranging the vent hole as described above, when an upper region of the airbag cushion advances more forward than the rim of the steering wheel, the vent hole is securely blocked by an automobile interior component. If the arrangement above is not made (outside the range of 10° to 170°), the vent hole may not reach the automobile interior component or the vent hole may make contact with the automobile interior component at an angle. Thus, the vent hole may not be fully sealed.

The airbag cushion can include: an occupant side panel facing the occupant; a steering wheel side panel opposite the occupant side panel; and a side panel connecting the occupant side panel and steering wheel side panel. In this case, the vent hole can be formed in the side panel.

Furthermore, the airbag cushion can include an occupant side panel facing the occupant and a steering wheel side panel opposite the occupant side panel, have a structure in which at least one of the steering wheel side panel and the occupant side panel has a notch formed so as to gradually narrow toward the center from an outer periphery, and be three-dimensionally molded by joining opposite sides of the notch such that the center side of the airbag cushion is convex. In this case, the vent hole can be formed on the steering wheel side panel.

The expanded and deployed airbag cushion can be configured so as to be positioned to the rear of the vehicle from the rim of the steering wheel before the occupant comes into contact with the expanded and deployed airbag cushion. Herein, "before the occupant comes into contact with the expanded and deployed airbag cushion" refers to an initial state of the airbag cushion being deployed.

At a stage before the occupant comes into contact with the expanded and deployed airbag cushion, a thickness D1 of an upper end part of the airbag cushion in a direction parallel to a rotation axis of the steering wheel can be larger than a thickness D2 of a lower end part, when the airbag cushion is viewed from a side.

Herein, the thicknesses D1 and D2 of the upper end part and lower end part of the airbag cushion are measured from the front surface of the rim of the steering wheel, and can be specified as the thickness of the upper end part (highest part) and the thickness of the lower end part (lowermost part) of the airbag cushion in a direction parallel to a rotation axis of the steering wheel.

As described above, by configuring the airbag cushion such that the thickness of the airbag cushion in the front-to-back direction is larger in the upper region than in the lower region at the stage before the occupant comes into contact with the expanded and deployed airbag cushion, it is possible to adequately protect the occupant's head with a sufficiently thick airbag cushion when the occupant's head enters the upper portion of the expanded and deployed airbag cushion. Furthermore, the deployment posture of the airbag cushion is stabilized, and the vent hole of the airbag cushion reliably reaches (contacts) the automobile interior component.

A length H2 of a lower portion than a center of rotation of the steering wheel can be configured to be longer than a length H1 of an upper portion, when the expanded and deployed airbag cushion is viewed from a side. Herein, the lengths H2 and H1 can be defined as lengths in a direction extending parallel to a front surface of the rim, orthogonal to the rotation axis of the steering wheel when the deployed airbag cushion is viewed from a side.

As described above, by lengthening the lower portion of the deployed airbag cushion, the area in the vicinity of the abdomen of the occupant is reliably protected, and an unfavorable situation such as the area in the vicinity of the abdomen impacting the steering wheel can be avoided.

The interior component includes a portion of the steering wheel or an instrument panel.

BRIEF DESCRIPTION OF THE DRAWINGS

FIG. 1 is a side surface view illustrating a state immediately after the airbag device according to the present invention is activated and an airbag cushion has expanded and deployed.

FIGS. 2(A), (B), and (C) are upper surface views illustrating steering wheel shapes of a vehicle applicable to the present invention.

FIG. 3 is a side surface view illustrating a state in which an occupant enters into (contacts) an airbag cushion that has expanded and deployed due to the airbag device according to the present invention being activated.

FIG. 4 is a plan view illustrating a panel configuration of an airbag cushion according to Embodiment 1 of the present invention.

FIG. 5 is an explanatory diagram illustrating dimensions of the airbag cushion of the airbag device according to Embodiment 1 of the present invention, and schematically illustrates a state in which the airbag cushion is expanded and deployed.

FIG. 6 is a schematic diagram (side surface view) illustrating a deployed shape of the airbag cushion according to the present invention.

FIG. 7 is a plan view illustrating a panel configuration of an airbag cushion according to Embodiment 2 of the present invention.

FIG. 8 is a side surface view illustrating a state where the airbag cushion with the panel structure illustrated in FIG. 7 is deployed.

FIG. 9 is a plan view illustrating a panel configuration of an airbag cushion according to Embodiment 3 of the present invention.

FIG. 10 is a side surface view illustrating a state where the airbag cushion with the panel structure illustrated in FIG. 9 is deployed.

FIGS. 11(A) and (B) are plan views illustrating a panel configuration of an airbag cushion according to Embodiment 4 of the present invention, and FIG. 11(C) is a perspective view illustrating a state in which the airbag cushion is expanded and deployed.

FIG. 12 is a front surface view (A) and side surface view (B) illustrating a deployed state of an airbag cushion according to Embodiment 5 of the present invention.

FIG. 13 is a side surface view illustrating the airbag cushion according to Embodiment 6 of the present invention in a deployed state, where (A) illustrates a state of initial deployment and (B) illustrates a state of full deployment.

FIG. 14 is a side surface view illustrating a state inside a vehicle in which the airbag device according to Embodiment 7 of the present invention has been activated (the airbag cushion has expanded and deployed).

DESCRIPTION OF THE PREFERRED EMBODIMENTS

The airbag device according to the present invention will be described with reference to the accompanying drawings. In the description below, when an occupant is seated in a seat in a normal posture, the direction the occupant faces is referred to as the "front," the opposite direction is referred to as the "back," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the passenger is seated in the seat in a regular posture, the head direction of the passenger is referred to as "up," the waist direction of the passenger is referred to as "down," and the direction indicating the coordinate axis is referred to as the "vertical direction."

Note that as described above, the 12 o'clock, 3 o'clock, 6 o'clock, and 9 o'clock directions are positions when the steering wheel is regarded as a clock face, but the direction of the steering wheel when the vehicle is traveling straight is the standard, where upward or direction of travel is 12 o'clock. Based on the 12 o'clock position when the driver looks forward, a position rotated clockwise by 90 degrees is 3 o'clock, a position rotated by 180 degrees is 6 o'clock, and a position rotated by 270 degrees is 9 o'clock.

FIG. 1 is a side surface view illustrating a state inside a vehicle in which the airbag device according to the present invention has been activated (the airbag cushion has expanded and deployed). FIGS. 2(A), (B), and (C) are upper surface views illustrating variations of steering wheel shapes applicable to the present invention. FIG. 3 is a side surface view illustrating a state in which an occupant enters into (contacts) an airbag cushion that has been expanded and deployed due to the airbag device according to the present invention being activated.

The airbag device according to the present invention, for example, as illustrated in FIGS. 2(A), (B), and (C), is mounted on a steering wheel 12 with a rim 12a having an irregular shape, in which a distance d2 from the center of rotation to an upper edge part is shorter compared to a distance d1 from the center of rotation to the left and right edge parts, or in other words, a vertical direction or an upper portion of the steering wheel is flattened compared to a circle.

The steering wheel 12 illustrated in FIG. 2(A) has a shape in which a vicinity corresponding to 12 o'clock is missing from the normally used circular (annular) rim. The steering wheel 12 illustrated in FIG. 2(B) has a shape in which the vicinity corresponding to 12 o'clock extends horizontally without being convexly curved. In addition, the steering wheel 12 illustrated in FIG. 2(C) has a shape in which the vicinity corresponding to 12 o'clock is not convexly curved but is recessed in a concave shape. Steering wheels to which the present invention is applicable are not limited to the above-mentioned three patterns, and the present invention can be applied to various types of steering wheels having a shape where sufficient reaction force can not be obtained near 12 o'clock on the rim when the airbag cushion is deployed.

As illustrated in FIG. 1, the airbag device according to the present invention includes a gas generator 14 that generates expansion gas and an airbag cushion 16 that expands and deploys toward an occupant (driver) D side due to the expansion gas. The airbag cushion 16 has a pair of left and right vent holes 20 for exhausting the expansion gas. The pair of left and right vent holes 20 are formed higher than an upper end (L1) of the rim and forward of a center line (L2) extending orthogonally when the expanded and deployed airbag cushion is viewed from a side. Note that the center line (L2) is defined as an orthogonal line passing through a center position of a maximum width W1 of the expanded and deployed airbag cushion 16.

As illustrated in FIG. 3, the occupant comes into contact with the expanded and deployed airbag cushion 16, the airbag cushion 16 deforms toward the front of the vehicle, and when a portion of an upper region 16U of the airbag cushion 16 advances more forward than the rim of the steering wheel 12, the vent hole 20 contacts an instrument panel 18 or other automobile interior component such that the vent hole 20 is blocked.

The timing at which the upper region 16U of the airbag cushion comes into contact with the instrument panel 18 positioned forward of the steering wheel 12 is set as described above, such that the vent holes 20 of the airbag cushion 16 are blocked by contacting the instrument panel 18 at an optimal timing.

According to the present invention, when the upper region 16U of the airbag cushion 16 advances more forward than the steering wheel 12 due to the entry of the occupant D, the vent hole 20 is configured to be blocked by contacting the instrument panel 18. Therefore, for example, when an occupant with a large physique enters (contacts) the airbag cushion 16, gas is not discharged more than necessary, and thus the deployment shape of the airbag cushion 16 can be maintained. As a result, it is possible to avoid a situation in which an occupant is sandwiched by a collapsed airbag cushion 16 and impacts the instrument panel 18, thereby reliably protecting the occupant. Note that an "occupant with a large physique" can be considered, for example, an AM50 equivalent or larger occupant as defined in the crash safety performance evaluation standards by FMVSS 208 (U.S. crash safety regulations).

On the other hand, if the occupant's physique is relatively small and the forward deformation of the airbag cushion 16 is small, the airbag cushion 16 can maintain a proper deployment posture and shape with only the reaction force from the steering wheel 12. Therefore, the vent holes 20 are not blocked by the instrument panel 18, the airbag cushion 16 expands and deploys normally, and the expansion gas is exhausted through the vent holes 20. Note that an "occupant with a small physique" can be considered, for example, an AF05 equivalent or smaller occupant as defined in the crash safety performance evaluation standards by FMVSS 208 (U.S. crash safety regulations).

FIG. 4 is a plan view illustrating a panel configuration of the airbag cushion 16 according to Embodiment 1 of the present invention. FIG. 5 is an explanatory diagram illustrating dimensions and the like of the airbag cushion 16 of the airbag device according to the present invention, and illustrates a state in which the airbag cushion is expanded and deployed.

Note that in Embodiments 1 to 7 described below, identical or corresponding components are indicated with the same symbols, and redundant descriptions are omitted.

In Embodiment 1 of the present invention as illustrated in FIG. 4, the airbag cushion 16 is molded from: an occupant side panel 32 facing the occupant ID, a steering wheel side panel 34 opposite the occupant side panel 32; and a fan-shaped side panel 38 connecting the occupant side panel 32 and steering wheel side panel 34. An opening part 36 in which the gas generator 14 is installed is formed in a center of the steering wheel side panel 34. Two vent holes 20 are formed on left and right symmetrical positions of the side panel 38.

A sewing line 32a of the occupant side panel 32 and a sewing line 38a of the side panel 38 are sewn together. Furthermore, a sewing line 34a of the steering wheel side panel 34 and a sewing line 38b of the side panel 38 are sewn together. Thereby, the airbag cushion 16 with a deployment shape as illustrated in FIG. 5 is configured. In the present embodiment, the side panel 38 is provided around the entire circumference of the occupant side panel 32 and the steering wheel side panel 34.

As illustrated in FIG. 5, the vent holes 20 are formed in a range of 150 mm to 400 mm from the center X of an attachment position of the gas generator 14 as a distance (A+B) on a front surface of the airbag cushion 16. Note that the "center of an attachment position of the gas generator" coincides with a center of rotation of the steering wheel 12.

Furthermore, the vent holes 20 are formed within a range of 10° to 170° upward with respect to a line L4 hypothetically drawn in a horizontal direction from the center X of the attachment position of the gas generator 14, when the expanded and deployed airbag cushion 16 is viewed from a steering wheel 12 side or an occupant side.

As illustrated in FIG. 1 and FIG. 5, by arranging the vent holes 20 as described above, when the upper region 16U of the airbag cushion 16 advances more forward than the rim of the steering wheel 12, the vent holes 20 are securely blocked by the instrument panel 18. If the arrangement above is not made, the vent holes 20 may not reach the instrument panel 18 or the vent holes 20 may make contact with the instrument panel 18 at an angle. Thus, the vent holes 20 may not be fully sealed.

FIG. 6 is a schematic diagram (side surface view) illustrating a deployed shape of the airbag cushion according to the present invention. As illustrated in FIG. 6, a thickness D2 of a lower region 16L of the airbag cushion 16 is configured to be smaller than a thickness D1 of an upper region 16U at a stage before the occupant D comes into contact with the expanded and deployed airbag cushion 16. The thicknesses D1 and D2 are measured from a front surface 12x of the rim of the steering wheel 12, which can be specified as the thickness of an upper end part (highest part) 100U and the thickness of a lower end part (lowermost part) 100L of the airbag cushion 16 in a direction parallel to the rotation axis X of the steering wheel 12. Herein, the upper end part 100U and the lower end part 100L of the airbag cushion 16 can be the farthest points above and below the rotation axis in a direction orthogonal to the rotation axis of the steering wheel 12.

The ratio of the thicknesses D1 and D2 is preferably in the range of 1.1:1 to 2.3:1. For example, the thickness D1 can be 350 mm to 400 mm, preferably 355 mm, and the thickness D2 can be 250 mm to 320 mm, preferably 300 mm. The difference D3 between the thicknesses D1 and D2 can be set to about 50 mm. Furthermore, the thickness D0 at the position corresponding to the rotation axis of the steering control system 2 is preferably set to a value such that a relationship of D1>D0>D2 is established.

In the present embodiment, the thicknesses D1, D2 and the like of the airbag cushion 16 are set as described above, but when the thickness D1 of the upper region 16U is larger than the above range with respect to the lower region 16L, there is a risk that the capacity of the airbag cushion 16 will become large or that the protection of the torso portion of the occupant D will be insufficient. On the other hand, if the thickness D1 of the upper region 16U of the airbag cushion 16 is smaller than the above range with respect to the lower region 16L, there is a possibility that a sufficient reaction force cannot be obtained even if the front surface side of the upper region 16U comes into contact with the instrument panel 18. In other words, by setting the thicknesses D1 and D2 of the airbag cushion 16 in the front-to-back direction as described above, the restraining performance of the occupant D can be appropriately maintained.

In addition, in the expanded and deployed airbag cushion 16, the length H2 of the portion below the center of rotation X of the steering wheel 12 is set to be longer than the portion H1 on the upper side. By lengthening the length H2 of the lower portion 16L of the deployed airbag cushion 16, as illustrated in FIG. 3, the area in the vicinity of the abdomen of the occupant D is reliably protected, and an unfavorable situation such as the area in the vicinity of the abdomen impacting the steering wheel 12 and the like can be avoided.

FIG. 7 is a plan view illustrating a panel configuration of the airbag cushion 116 according to Embodiment 2 of the present invention. FIG. 8 is a side surface view illustrating a state where the airbag cushion 116 with the panel structure illustrated in FIG. 7 is deployed.

In the present embodiment, the airbag cushion 116 is configured from: the occupant side panel 32 facing the occupant ID, the steering wheel side panel 34 opposite the occupant side panel 32; and a side panel 138 connecting the occupant side panel 32 and steering wheel side panel 34. An opening part 36 in which the gas generator 14 is installed is formed in the center of the steering wheel side panel 34. Two vent holes 120 are formed on the left and right symmetrical positions of the side panel 138.

A sewing line 32a of the occupant side panel 32 and a sewing line 138a of the side panel 138 are sewn together. Furthermore, a sewing line 34a of the steering wheel side panel 34 and a sewing line 138b of the side panel 138 are sewn together. Thereby, the airbag cushion 116 with a deployment shape as illustrated in FIG. 8 is configured. In the present embodiment, the side panel 138 is provided all around the occupant side panel 32 and steering wheel side panel 34, such that the width of the upper region 116U of the expanded and deployed airbag cushion 116 in the front-to-back direction gradually narrows toward the lower region 116L.

FIG. 9 is a plan view illustrating a panel configuration of the airbag cushion 216 according to Embodiment 3 of the present invention. FIG. 10 is a side surface view illustrating a state where the airbag cushion 216 with the panel structure illustrated in FIG. 9 is deployed.

In the present embodiment, the airbag cushion 216 is configured from: the occupant side panel 232 facing the occupant D; the steering wheel side panel 234 opposite the occupant side panel 232; and a side panel 238 connecting the occupant side panel 232 and steering wheel side panel 234. The side panel 238 has a pupil shape with two arcuate edge portions. An opening part 236 in which the gas generator 14 is installed is formed in the center of the steering wheel side panel 234. A pair of vent holes 220 are formed symmetrically on the left and right of the side panel 238.

A sewing line 232a of the occupant side panel 232 and a sewing line 238a of the side panel 238 are sewn together. Furthermore, a sewing line 234a of the steering wheel side panel 234 and a sewing line 238b of the side panel 238 are sewn together. Thereby, the airbag cushion 216 with a deployment shape as illustrated in FIG. 10 is molded. Note that in the present embodiment, the structure is such that the occupant side panel 232 and an upper portion of the steering wheel side panel 234 are connected via the side panel 238, the side panel 238 is not present in a lower portion of the occupant side panel 232 and steering wheel side panel 234, and the occupant side panel 232 and the steering wheel side panel 234 are sewn directly together.

FIGS. 11(A) and (B) are plan views illustrating a panel configuration of an airbag cushion 316 according to Embodiment 4 of the present invention, and FIG. 11(C) is a perspective view illustrating a state in which the airbag cushion 316 is expanded and deployed. The airbag cushion 316 is configured from a circular occupant side panel 332 that forms an occupant facing surface and a steering wheel side panel 334 on an opposite side from the occupant facing surface.

The steering wheel side panel 334 has a shape in which V-shaped notch parts 350 are provided at four locations on a peripheral edge part of a circular panel. The notch parts 350 are provided at equal positions in a circumferential direction or the like on the steering wheel side panel 334.

An opening 336 for an inflator is provided in a center of the steering wheel side panel 334, and small holes for bolt insertion are provided around the opening 336 for an inflator. Two vent holes 320 are provided on a center side of the steering wheel side panel 334 at a prescribed distance from a peripheral edge.

The steering wheel side panel 334 is bowl-shaped by sewing sides of the notch parts 350 together. A diameter of an outer peripheral end of the bowl-shaped steering wheel side panel 334 is substantially the same as a diameter of the circular occupant side panel 332. The airbag cushion 316 is formed by sewing a peripheral edge of the bowl-shaped steering wheel side panel 334 to a peripheral edge of the occupant side panel 332.

FIG. 12 is a front surface view (A) and side surface view (B) illustrating a deployed state of an airbag cushion 416 according to Embodiment 5 of the present invention. The present embodiment is an arrangement of the airbag cushion 116 of the Embodiment 2. The airbag cushion 416 has a non-slip region 414 having a friction coefficient μ of 2.0 or more relative to the airbag cushion 116 of Embodiment 2 formed at a lower end portion of the occupant side panel 102 facing the occupant D. The non-slip region 414 can be formed by applying a material having a large coefficient of friction (silicon or the like) or attaching a panel (cloth) having a high coefficient of friction on the surface. When the airbag cushion 416 expands and deploys, the non-slip region 414 is positioned in the vicinity of the abdomen of the occupant to prevent the airbag cushion 416 from sliding and moving in the vertical direction relative to the occupant. In other words, the relative positional relationship between the airbag cushion 416 and the occupant can be maintained at an appropriate position.

FIG. 13 is a side surface view illustrating the airbag cushion according to Embodiment 6 of the present invention in a deployed state, where (A) illustrates a state of initial deployment and (B) illustrates a state of full deployment. In the present embodiment, a diffuser 500 is provided around the inflator (14) in the airbag cushion 16. The diffuser 500 includes an opening 500a for guiding the gas downward and a vent hole 500b for discharging the gas to the side.

Furthermore, in an initial stage of deployment of the airbag cushion 16, as illustrated in FIG. 13(A), the gas is guided downward by the diffuser 500, and the lower region 16L of the airbag cushion 16 starts deploying first. The lower region 16L of the airbag 16 is first deployed, and thus the airbag cushion 16 reaches the vicinity of the abdomen of the occupant, allowing the possibility of injury due to impacting the steering wheel 12 to be reduced.

Thereafter, as illustrated in FIG. 13(B), the gas also flows into the upper region 16U of the airbag cushion 16, and thus the airbag cushion 16 is fully deployed. In the present embodiment, the airbag cushion 16 can be deployed (wedged in between) into the abdomen of the occupant faster than in the other embodiments. Note that the diffuser 500 according to the present embodiment is applicable to all other embodiments.

FIG. 14 is a side surface view illustrating a state inside a vehicle in which the airbag device according to Embodiment 7 of the present invention has been activated (the airbag cushion has expanded and deployed). In the present Embodiment, a tether 618 is connected to a lower portion inside the airbag cushion 616 to regulate the width (thickness) in the front-to-back direction. With such a structure, an appropriate (non-excessive) amount of gas flows through a region of the airbag cushion 616 positioned in the vicinity of the abdomen of the occupant D, and the deployment behavior can be optimized, such as the deployment speed, deployment shape, and the like of the entire airbag cushion 616. Note that code 620 represents a vent hole similar to Embodiment 1.

Embodiments of the present invention have been described above. However, the present invention is in no way limited by these embodiments and may be changed within a scope of technical ideas set forth in the patent claims.

The invention claimed is:

1. An airbag device mounted on a steering wheel of a vehicle having a rim with a shape in which a distance from a center of rotation to an upper edge part is shorter than a distance to left and right edge parts, comprising:
   a gas generator secured to the steering wheel and for generating expansion gas; and
   an airbag cushion configured to expand and deploy toward an occupant side by the expansion gas; wherein
   an upper region of the expanded and deployed airbag cushion has a vent hole for exhausting the expansion gas, the entire upper region of the expanded and deployed airbag cushion including the vent hole positioned to a rear of the vehicle from the rim of the steering wheel before an occupant comes into contact with the expanded and deployed airbag cushion, and
   the airbag cushion is configured such that when the occupant comes into contact with the expanded and deployed airbag cushion, the airbag cushion deforms toward a front of the vehicle from behind the rim of the steering wheel, and when a portion of the upper region of the airbag cushion including the vent hole advances over the rim of the steering wheel, the vent hole is provided at a position that is blocked by contacting an instrument panel of the vehicle located toward the front of the vehicle relative to the steering wheel.

2. The airbag device according to claim 1, wherein the vent hole is formed higher than an upper end (L1) of the rim and forward of a center line (L2) extending orthogonally when the expanded and deployed airbag cushion is viewed from a side.

3. The airbag device according to claim 2, wherein the vent hole is formed in a range of 150 mm to 400 mm from a center of an attachment position of the gas generator as a distance (A+B) on a front surface of the airbag cushion.

4. The airbag device according to claim 2, wherein the vent hole is formed within a range of 10° to 170° upward with respect to a line hypothetically drawn in a horizontal direction from a center of an attachment position of the gas generator, when the expanded and deployed airbag cushion is viewed from a steering wheel side or an occupant side.

5. The airbag device according to claim 1, wherein the airbag cushion includes: an occupant side panel facing the occupant; a steering wheel side panel opposite the occupant side panel; and a side panel connecting the occupant side panel and the steering wheel side panel.

6. The airbag device according to claim 5, wherein the vent hole is formed in the side panel.

7. The airbag device according to claim 5, wherein the vent hole is formed in the steering wheel side panel.

8. The airbag device according to claim 1, wherein the airbag cushion includes an occupant side panel facing the occupant and a steering wheel side panel opposite the occupant side panel,
   at least one of the steering wheel side panel and the occupant side panel has a notch formed so as to gradually narrow toward a center from an outer periphery, and
   opposing pieces of the notch are joined to three-dimensionally mold the airbag cushion such that a center side thereof is convex.

9. The airbag device according to claim 1, wherein before the occupant comes into contact with the expanded and deployed airbag cushion, a thickness D1 of an upper end part of the airbag cushion in a direction parallel to a rotation axis of the steering wheel is larger than a thickness D2 of a lower end part, when the airbag cushion is viewed from a side.

10. The airbag device according to claim 1, wherein a length H2 of a lower portion lower than a center of rotation of the steering wheel is longer than a length H1 of an upper portion, when the expanded and deployed airbag cushion is viewed from a side.

* * * * *